(12) United States Patent
Lapington

(10) Patent No.: US 9,396,913 B2
(45) Date of Patent: Jul. 19, 2016

(54) CHARGE READ-OUT STRUCTURE FOR A PHOTON / PARTICLE DETECTOR

(75) Inventor: Jonathan Stephen Lapington, Pwllheli (GB)

(73) Assignee: University of Leicester, Leicester (GB)

( * ) Notice: Subject to any disclaimer, the term of this patent is extended or adjusted under 35 U.S.C. 154(b) by 831 days.

(21) Appl. No.: 13/505,680

(22) PCT Filed: Nov. 1, 2010

(86) PCT No.: PCT/GB2010/002014
§ 371 (c)(1),
(2), (4) Date: Aug. 3, 2012

(87) PCT Pub. No.: WO2011/055107
PCT Pub. Date: May 12, 2011

(65) Prior Publication Data
US 2012/0293192 A1    Nov. 22, 2012

(30) Foreign Application Priority Data

Nov. 4, 2009  (GB) .................................. 0919311.1

(51) Int. Cl.
*G01R 27/08*    (2006.01)
*G01R 27/26*    (2006.01)
(Continued)

(52) U.S. Cl.
CPC ............. *H01J 43/025* (2013.01); *G01T 1/2935* (2013.01); *H01J 43/246* (2013.01)

(58) Field of Classification Search
CPC ........ G01R 7/082; G01R 27/08; G01R 27/26; G01T 1/29; G01T 1/2935; G03G 5/04; H01J 43/00; H01J 43/04; H01J 43/246; G06F 3/041–3/043; G06F 3/045
USPC ................... 324/658–690, 691; 345/173–178
See application file for complete search history.

(56) References Cited

U.S. PATENT DOCUMENTS 3,234,386 A * 2/1966 Leventhal ............... G01N 23/00
                                                     250/303
3,415,992 A * 12/1968 Webb ......................... 250/370.1
(Continued)

FOREIGN PATENT DOCUMENTS

JP      62-222182     9/1987
JP      01-201185     8/1989

OTHER PUBLICATIONS

Yu et al., "Simulation Analysis on Characteristics of a Planar Capacitive Sensor for Large Scale Measurement", ICICTA 2009, p. 201-204.*
(Continued)

*Primary Examiner* — Patrick Assouad
*Assistant Examiner* — Lamarr Brown
(74) *Attorney, Agent, or Firm* — Foley & Lardner LLP

(57) ABSTRACT

A charge read-out structure for photon and particle detectors, which is capable of spatially-resolving a position of the charge. The structure comprises a resistive element defining a detection surface which is capacitively coupled to an array of electrically insulated electrodes. Each electrode in the array is capacitively coupled to an adjacent electrode in the array to form a capacitively coupled network of electrodes. Selected ones of the electrodes in the array are each coupled to an array output for connection to a respective charge measurement device. The resistive element has a resistivity sufficient to temporarily localize a charge induced on the resistive element to an area corresponding to a subset of said electrodes in the array and for a duration sufficient for signal measurement from the array of electrodes. Charge measurement devices are coupled to selected electrodes in the network such that the spatial position of a charge event in the network can be determined by comparing the outputs from each charge measurement device.

19 Claims, 5 Drawing Sheets

(51) Int. Cl.
  *G06F 3/041* (2006.01)
  *G06F 3/045* (2006.01)
  *H01J 43/02* (2006.01)
  *G01T 1/29* (2006.01)
  *H01J 43/24* (2006.01)

(56) References Cited

U.S. PATENT DOCUMENTS

| | | | |
|---|---|---|---|
| 3,529,161 A * | 9/1970 | Kok et al. | 250/370.1 |
| 3,626,189 A * | 12/1971 | Berg | 250/385.1 |
| 3,694,655 A * | 9/1972 | Auer | 250/389 |
| 3,715,590 A | 2/1973 | Auer | |
| 3,898,465 A * | 8/1975 | Zaklad | G01T 3/008 250/385.1 |
| 3,975,639 A * | 8/1976 | Allemand | 250/385.1 |
| 4,070,578 A * | 1/1978 | Timothy et al. | 250/336.1 |
| 4,395,636 A | 7/1983 | Anger et al. | |
| 4,454,422 A * | 6/1984 | Persyk | 250/363.02 |
| 4,686,368 A * | 8/1987 | Anderson | G01N 27/44717 250/374 |
| 4,794,296 A * | 12/1988 | Warde et al. | 313/105 R |
| 4,810,893 A * | 3/1989 | Meertens | 250/385.1 |
| 4,874,939 A * | 10/1989 | Nishimoto et al. | 257/432 |
| 5,051,592 A * | 9/1991 | Trotel | H01J 47/02 250/385.1 |
| 5,144,141 A * | 9/1992 | Rougeot et al. | 250/369 |
| 5,192,861 A * | 3/1993 | Breskin et al. | 250/214 VT |
| 5,336,888 A * | 8/1994 | Odom | 250/495.1 |
| 5,347,132 A * | 9/1994 | Holzman et al. | 250/389 |
| 5,644,128 A * | 7/1997 | Wollnik et al. | 250/251 |
| 5,686,721 A | 11/1997 | Schmidt-Bocking | |
| 5,693,946 A * | 12/1997 | Vickers et al. | 250/370.08 |
| 5,693,947 A * | 12/1997 | Morton | G01T 1/185 250/370.09 |
| 5,786,597 A * | 7/1998 | Lingren et al. | 250/370.09 |
| 5,880,691 A * | 3/1999 | Fossum | H03M 1/0682 341/141 |
| 5,969,361 A * | 10/1999 | Blavette et al. | 250/397 |
| 5,986,278 A * | 11/1999 | Becker et al. | 250/580 |
| 6,034,373 A * | 3/2000 | Shahar et al. | 250/370.01 |
| 6,037,595 A * | 3/2000 | Lingren | G01T 1/241 250/370.01 |
| 6,521,894 B1 * | 2/2003 | Iwanczyk et al. | 250/370.11 |
| 6,781,133 B2 * | 8/2004 | Karplus et al. | 250/370.1 |
| 6,815,790 B2 * | 11/2004 | Bui et al. | 257/459 |
| 7,019,307 B1 | 3/2006 | Gribb et al. | |
| 2002/0003860 A1 * | 1/2002 | Francke et al. | 378/98.8 |
| 2002/0030908 A1 * | 3/2002 | Matsuda et al. | 360/15 |
| 2002/0088714 A1 * | 7/2002 | Motoi | H01J 43/246 205/118 |
| 2004/0101261 A1 * | 5/2004 | Rosine | G02B 6/08 385/120 |
| 2009/0008733 A1 * | 1/2009 | Cardoso et al. | 257/435 |
| 2009/0078024 A1 * | 3/2009 | Frith et al. | 73/28.02 |
| 2009/0173670 A1 * | 7/2009 | Okuda et al. | 209/127.1 |
| 2009/0242781 A1 | 10/2009 | Atsuta et al. | |
| 2010/0213382 A1 * | 8/2010 | Gros D'Aillon et al. | 250/370.09 |
| 2010/0265078 A1 * | 10/2010 | Friedman | 340/600 |
| 2013/0306852 A1 * | 11/2013 | Uchiyama | H01J 43/246 250/281 |

OTHER PUBLICATIONS

Audet et al., "High-purity silicon sensor array for imaging soft x-ray and infrared radiation", IEDM 1989, p. 177-180.*
Kemmerling et al., "A New Two-Dimensional Scintillation Detector System for Small-Angle Neutron Scattering Experiments", IEEE Transactions on Nuclear Science, vol. 48, No. 4, Aug. 2001, p. 1114-1117.*
Gott, R. et al., "The Use of Channel Multiplier Arrays for One and Two Dimensional X-Ray Image Dissection," IEEE Trans. Nucl. Sci., vol. 17 (3) 1970, pp. 367-373.
International Search Report and Written Opinion for PCT/GB2010/002014, mailed Oct. 11, 2011.
Kikombo, Andrew Kilinga et al., "A photon position sensor consisting of single-electron circuits," Nanotechnology 20 (2009), 7 pages.
Search Report issued on Great Britain application 0919311.1, dated Feb. 26, 2010.
EP Communication issued on EP Application 10778704.6, mailed Jul. 16, 2015.
Examination Report on EP Application 10778704.6, mailed Aug. 19, 2014.
Milnes, James et al., "Nuclear Instruments and Methods in Physics Research A," Nuclear Instruments and Methods in Physics Research, Section A, vol. 604, No. 1-2, Feb. 8, 2009, pp. 218-220.

* cited by examiner

CHARGE READ-OUT STRUCTURE FOR A PHOTON / PARTICLE DETECTOR

CROSS-REFERENCE TO RELATED APPLICATIONS

This application is a U.S. national stage application of International Application Serial No. PCT/GB2010/002014, filed on Nov. 1, 2010, and claiming the benefit of the filing date of GB 0919311.1, filed on Nov. 4, 2009, the entire disclosures of which are hereby incorporated by reference for all purposes in their entirety as fully set forth herein.

The present invention relates to charge read-out structures used in, for example, photon and particle detectors, and in particular to charge read-out structures capable of spatially-resolving a position of the charge.

Detectors for detecting electromagnetic radiation quanta or particles conventionally use a conversion device such as a photocathode together with a microchannel plate electron multiplier to generate an electron charge cloud arising from an interaction of the detector with a radiation quantum or particle to be detected. The electron charge cloud is detected and its position is spatially resolved using an adjacent anode structure.

U.S. Pat. No. 5,686,721 describes such a detector having a spatially-resolving anode structure comprising a high resistance, electrically conductive thin film anode adjacent to the charge multiplier and a low resistance anode structure capacitively coupled to the high resistance anode. The high resistance anode is formed on the vacuum side of a chamber wall and the low resistance anode is formed on the other side of the chamber wall, e.g. at ambient atmospheric pressure. The chamber wall is formed of, e.g. glass, such that the high resistance anode and the low resistance anode are capacitively coupled. An electron cloud impinging on the high resistance thin film anode remains there for a few tens of nanoseconds due to the high layer resistance. This capacitively couples through the glass layer of the chamber wall to generate an image charge on or in the low resistance anode structure.

The low resistance anode comprises a spatially-resolving structure such as a three-contact region wedge-and-strip arrangement. The spatial location of the image charge can be determined using a charge-sensitive preamplifier for each contact region and an evaluation logic system. Other spatially resolving anode structures are described, such as a Vernier anode, a spiral anode, a delay line layer and a pixel system with digital read out. The system of U.S. Pat. No. 5,686,721 requires that the internal resistances of the high- and low-resistance anode layers are optimally matched to one another and that the geometrical configuration of the low-resistance anode is suited to spatially resolving the image charge. Spatial resolution may be limited by the configuration of individually readable contact regions of the low-resistance anode.

R Gott et al: "The use of channel multiplier arrays for one and two dimensional x-ray image dissection", IEEE Trans. Nucl. Sci., Vol. 17 (3) 1970, pp. 367-373 describes a channel multiplier array and collector subsystem in which electron pulses from individual channels in the array are collected using an evenly spaced grid of wires. Adjacent wires in the grid are coupled by condensers and each of the wires in the grid is resistively grounded. A charge pulse arriving at a particular wire in the grid is divided by the capacitive network and fed to two charge sensitive pre-amplifiers. From these, the position of the charge pulse, relative to the grid, can be established. Spatial resolution may be limited by the number of discrete components, including the condensers and grounding resistors, that must be incorporated with the grid of wires.

It is an object of the present invention to provide an improved, spatially resolving, charge read-out structure suitable for use in a photon or particle detector.

According to one aspect, the present invention provides a spatially-resolving charge detection device comprising:
 a resistive element defining a detection surface and being capacitively coupled to an array of electrically insulated electrodes, each electrode in the array being capacitively coupled to an adjacent electrode in the array to form a capacitively coupled network of electrodes,
 selected ones of the electrodes in the array each being coupled to an array output for connection to a respective charge measurement device;
 the resistive element having a resistivity sufficient to temporarily localize a charge induced on the resistive element to an area corresponding to a subset of said electrodes in the array and for a duration sufficient for signal measurement from the array of electrodes.

The charge detection device may include a plurality of charge measurement devices coupled to the network, each charge measurement device being coupled to a different electrode in the array to sample a charge therefrom. When used as a particle or photon detector, the charge detection device may include a multiplication device for interacting with the particle or photon and generating a charge cloud therefrom; the multiplication device being positioned adjacent to the resistive element such that the resistive element interacts with the charge cloud to capture a charge thereon. The multiplication device may be an electron multiplication device. The multiplication device may be a microchannel plate, a photomultiplier, or a gas proportional counter. The interacting particle may be a photon, ionizing particle or charged particle.

The array of electrically insulated electrodes may comprise a one, two or three dimensional array of electrodes adapted for spatially resolving a charge on the resistive element respectively in one or two dimensions. The array of electrically insulated electrodes may comprise an array of electrically conductive elements, with each element within the body of the array being capacitively coupled to the closest neighbour elements with a first capacitance value, and each element at the periphery of the array being capacitively coupled to adjacent elements on the periphery of the array with a second capacitance value, the second capacitance value being greater than the first capacitance value. Each element in the body of the array may be capacitively coupled to the next nearest elements in the array by a third capacitance value that is substantially lower than the first capacitance value. The second capacitance value may be between 10 and 100 times greater than the first capacitance value.

The charge measurement devices may be connected to selected elements in the array, preferably elements at the periphery of the array and more preferably corner elements of the array. A processing device may be coupled to each of the charge measurement devices to determine a spatial position of a localised charge on the resistive element based on the relative outputs of each charge measurement device.

The array of electrically insulated electrodes may comprise a first sub-array of electrically conductive elements, each element within the body of the first sub-array being capacitively coupled to first selected closest neighbour elements with a first capacitance value, and each element in the body of the first sub-array having minimal or no capacitive coupling with second selected closest elements in the first sub-array, selected elements at the periphery of the first sub-array being directly electrically connected to adjacent elements on the periphery of the first sub-array. The array may include a second sub-array of conductive elements complementary to, and overlapping the first sub-array, the first sub-array being adapted for detecting the spatial position of charge on the resistive element in one dimension and the second sub-array being adapted for detecting the spatial position of charge on the resistive element in a second dimension different from the first dimension. Charge measurement devices may be connected to respective groups of the selected elements at the periphery of the array.

The resistive element preferably has a surface resistivity adapted to enable charge localization over a time period in the range 1 to 1000 ns, or in other embodiments a time period in the range 1 to 10000 ns.

According to another aspect, the present invention provides a method of spatially-resolving the position of charge on a resistive element of a charge detection device comprising the steps of:
capturing a charge on a detection surface defined by a resistive element that is capacitively coupled to an array of electrically insulated electrodes, each electrode in the array being capacitively coupled to an adjacent electrode in the array to form a capacitively coupled network of electrodes,
forming an capacitively induced charge on at least one of the electrodes in the array;
measuring the capacitively induced charge by sampling the array using a plurality of charge measurement devices coupled to selected ones of the electrodes in the array;
determining the location of the capacitively induced charge based on the relative outputs of said charge measurement devices,
the resistive element having a resistivity sufficient to temporarily localize a charge on the resistive element to an area corresponding to a subset of said electrodes in the array and for a duration sufficient for signal measurement from the array of electrodes.

Embodiments of the present invention will now be described by way of example and with reference to the accompanying drawings in which.

Figure 1:
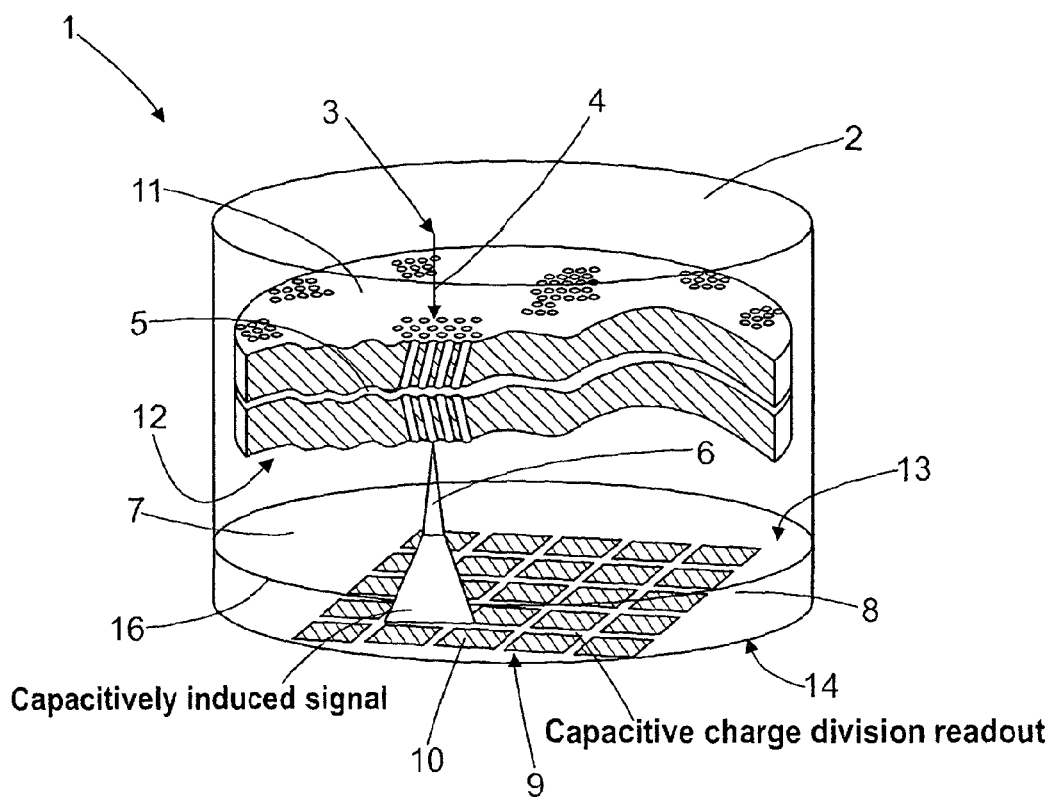
FIG. 1 is a schematic perspective view of a photon detector with a capacitively coupled charge read-out structure.

With reference to FIG. 1, a photon detector 1 comprises a photocathode 2 or other suitable conversion medium for converting an incident photon 3 or particle into an electron 4. Adjacent to the photocathode 2 is an electron multiplier which, in this arrangement, comprises a microchannel plate 5. A first surface 11 of the microchannel plate 5 (the upper surface as shown in FIG. 1) provides an input surface and a second surface 12 of the microchannel plate 5 (the underside as shown in FIG. 1) provides an output surface. Adjacent to the second surface 12 of the microchannel plate 5 is a planar resistive layer 7 formed on a first surface 13 of a dielectric substrate 8. On the opposing surface 14 of the dielectric substrate 8 is an array 9 of insulated electrodes 10 which comprise a capacitively coupled network to be described further in connection with FIG. 2.

In operation, an incident photon 3 interacts with the photocathode 2 at a particular event interaction x-y co-ordinate on the cathode, the x-y plane being defined by the plane of the photocathode. This interaction generates a photoelectron 4 which is accelerated toward and into the microchannel plate 5 which is used to create a cloud of electrons 6 from each incident electron 4. The electron cloud 6 typically comprises $10^5$ to $10^7$ electrons. The electron cloud emerges from the output surface 12 of the microchannel plate 5 and is directed toward an anode formed by the resistive layer 7. The cloud of electrons emerging from the output surface 12 of the microchannel plate 5 maintains spatial correlation with the x-y event interaction co-ordinate and with x-y position of the incident photon at the input surface 11 because of the channel structure of the microchannel plate. The centroid of the charge cloud represents the x-y coordinates of the incident photon 3.

The resistive layer 7 forms an anode for the photon detector and the potential is defined by a surrounding conductor 16 which also provides a DC discharge path for charge collected on the anode. The resistive layer 7 defines a resistive element having a resistivity that is sufficiently high to temporarily localize a charge generated by the electron charge cloud 6 to an area of the anode for sufficient period of time for signal measurement from the array 9 of insulated electrodes 10. Preferably, the resistivity is such that the charge remains localized to a first insulated electrode 10 in the array 9 (or several adjacent electrodes 10) for a suitable sampling period. A suitable sampling period may be between 1 and 10000 ns. The resistivity of the resistive layer 7 is sufficiently low that the charge leaks away via the surrounding conductor 16 over a longer timescale than the sampling period. A range of possible resistivity values for the resistive element is 100 kOhm to 100 MOhm per square, and optimally between 1 MOhm to 10 MOhm per square). In this way, an image of the spatial distribution of the incident photons 3 arriving at the photocathode 2 can be generated.

Figure 2:
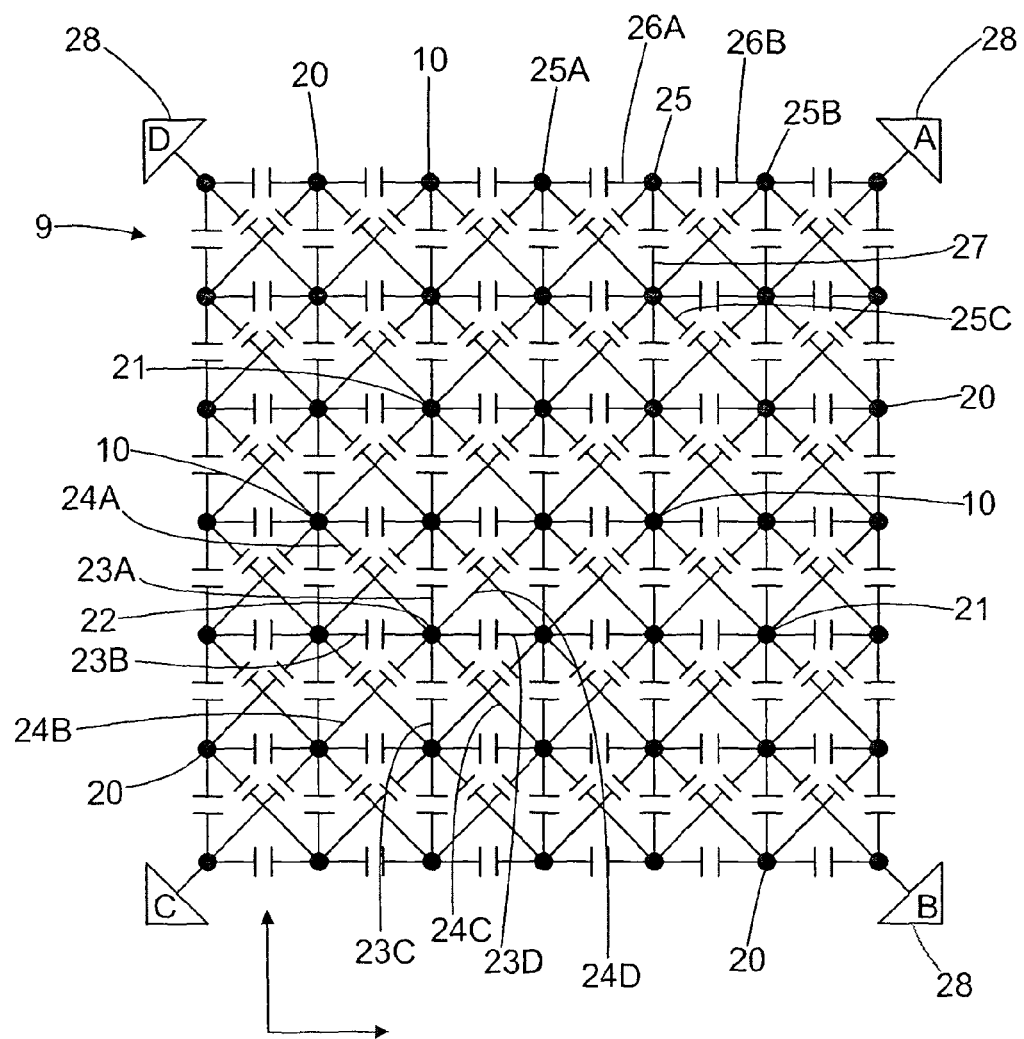
FIG. 2 is a schematic circuit diagram of a capacitively coupled network of elements for forming the charge read-out structure of a photon detector as in FIG. 1.

An exemplary arrangement for the array 9 of insulated electrodes 10 is shown schematically in FIG. 2. The electrodes 10 generally form a two dimensional array of electrically conductive elements in which each element is capacitively coupled to its immediate closest neighbours. Thus, in the example of element 22, it is capacitively coupled to its four closest neighbour elements as indicated schematically by first capacitances 23a, 23b, 23c, 23d disposed parallel to the array axes. More particularly, each conductive element 22 is also capacitively coupled to each next nearest element in the array as indicated schematically by second capacitances 24a, 24b, 24c, 24d disposed diagonally to the array axes. This is the configuration for all elements 22 that are disposed within the body of the array 9, i.e. that have nearest neighbour elements on all four sides. The elements in the body of the array are generally numbered 21.

For the elements 20 at the periphery of the array, i.e. those not having a nearest neighbour element on all four sides, these elements are capacitively coupled to each other with a capacitance value that is greater than the capacitive coupling between elements within the body of the array. For example, peripheral element 25 is capacitively coupled to nearest neighbour peripheral elements 25a, 25b by capacitances indicated schematically as third capacitances 26a and 26b respectively. Peripheral element 25 is also capacitively coupled to nearest neighbour 25c within the body of the array by a fourth capacitance indicated by capacitor 27.

Preferably, the third capacitances 26 (i.e. capacitance values coupling adjacent elements 20 at the periphery of the array 9) are between 10 and 100 times greater than the first capacitances 23 (i.e. capacitance values coupling closest neighbour elements 21 within the body of the array), or any suitable value that facilitates a linear response as will be discussed hereinafter. The first capacitances may be as low as 1 pF or less. The second capacitances are preferably as low as possible to minimize non-linearity. In a preferred embodiment, the second capacitances are less than 10% of the first capacitances.

A charge measurement device 28A, 28B, 28C, 28D is provided at each corner of the array 9, being connected to the corner elements 20 of the periphery of the array. Preferably, the charge measurement devices 28 comprise low impedance amplifiers which may be charge sensitive or trans-impedance amplifiers.

The capacitive coupling of the electrodes 10 in the network results in a division of the capacitively induced charge among the elements 20, 21 in the network in a manner that is defined by the particular network configuration and which can be detected by the charge measurement devices 28A to 28D which serve as read-out nodes.

Figure 3:
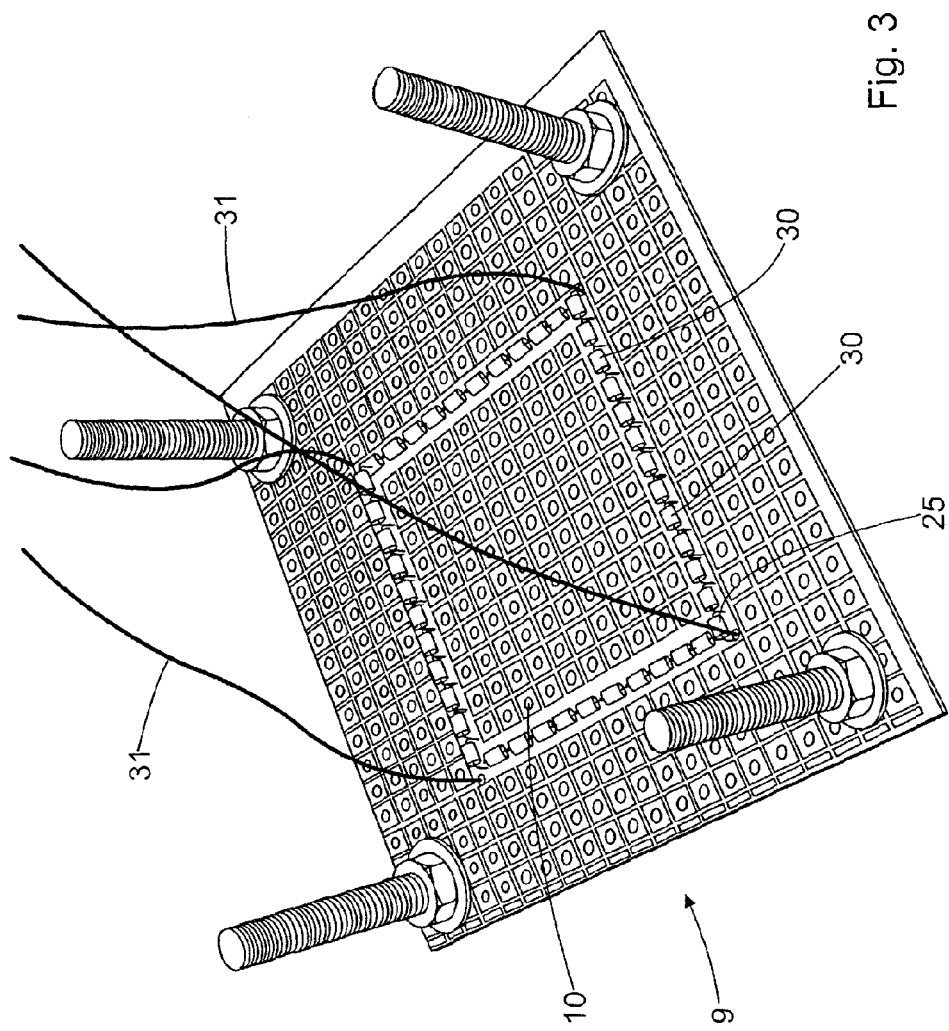
FIG. 3 is a perspective view of an actual device comprising a capacitively coupled network of elements for forming the charge read-out structure of a photon detector as in FIG. 1.

FIG. 3 shows a perspective view of an exemplary physical arrangement of an array 9 of capacitively coupled electrodes 10. The array shown comprises an array of insulated electrodes. Each electrode comprises a conductive area on a first side of the substrate electrically coupled to a corresponding conductive area on the second side of the substrate by way of a via. The conductive areas on the first side of the substrate are insulated from one another, and the conductive areas on the second side of the substrate are also insulated from one another. The conductive areas on the second side (those visible in the figure) are used for connection of the charge measurement devices and surface mounted peripheral capacitors 30 added around the perimeter to provide the higher capacitance needed between the peripheral elements 25 in the array 9. These correspond to the third capacitors 26a and 26b of FIG. 2. The four charge signals from the array are fed to the charge measurement devices 28A . . . 28D (FIG. 2) via the wires 31 shown in FIG. 3. FIG. 3 shows the rear side of the device, i.e. that corresponding to the surface 14 in FIG. 1. The other surface of the board not seen in FIG. 3 is held in contact with the dielectric substrate 8 of the detector 1.

Figure 4:
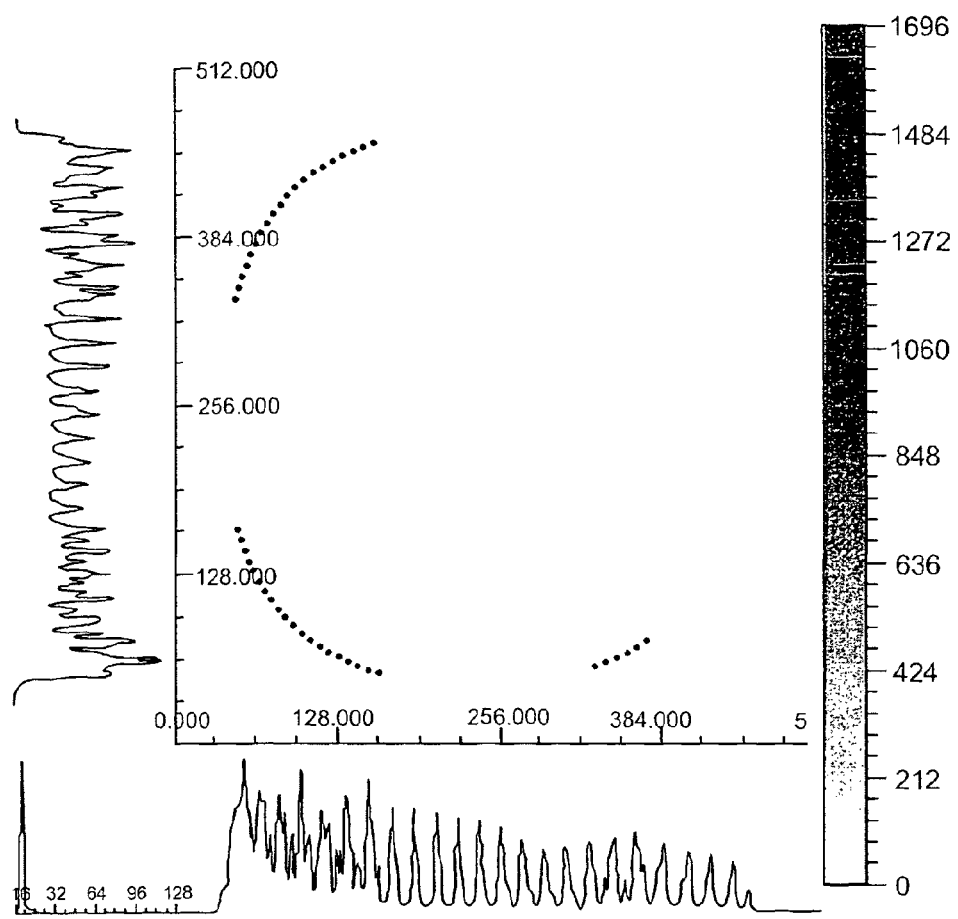
FIG. 4 is a graphical representation of an image of a pinhole mask generated using a photon detector according to FIGS. 1, 2 and 3.

A real image taken with a microchannel plate detector in photon-counting mode is shown in FIG. 4. An image of a 1 mm pitch pinhole mask was taken using the photon counting detector of FIG. 3 with the read-out anode array 9 configuration shown in FIG. 2. The diameter of the active area of the image readout is 25 mm. The event count integrated over a period of time as a function of x-position is plotted in the graph along the x-axis; the event count integrated over a period of time as a function of y-position is plotted in the graph along the y-axis; and the resulting x-y intensity plot is shown with intensity grey scale on the right hand side. The mask comprised a square array of pinholes with a 1 mm pitch plus four arrays of pinholes arranged as arcs in the four corners of the mask (of which only two and a half are visible due to misalignment).

The exemplary embodiment shown in FIG. 1 comprises a photon or particle detector 1 using a microchannel plate 5 as an electron multiplication device. Alternative arrangements may include a detector using an imaging photomultiplier or gas proportional counter. The dielectric substrate 8 may be any suitable material for capacitively coupling the resistive layer 7 with the array 9 of insulated electrodes 10. The array 9 of electrodes 10 and the resistive layer 7 may be constructed on opposite surfaces of the same dielectric substrate 8 or they may be constructed as separate elements placed in proximity to one another. The latter configuration has manufacturing advantages when applied to vacuum photomultiplier tube applications since the array 9 and connections thereto need not meet the vacuum tube material specification and processing requirements.

The signal charge on the electrode array 9 is capacitively induced and is AC coupled, so no resistive coupling of these electrodes is required for discharge. A simple array of insulated conductive elements 10 (e.g. insulated islands of copper on a single or multi-layer PCB) can be used, such as shown in FIG. 3.

The physical capacitance of the geometry of the electrodes 10 can be used in the bulk of the pattern for the array coupling, greatly simplifying the design by avoiding the need for discrete passive components (capacitors). The preferred design shown in FIG. 3 uses surface mount capacitors 30 between each perimeter electrode 25, but other designs can either use enlarged area perimeter conductors to produce these higher capacitance values, or do not require such capacitances.

The preferred design of FIG. 2 is a two dimensional array of conductor elements 20, 21 each capacitively coupled to nearest and second nearest neighbouring electrodes. In this scheme the charge is preferably measured at the four corners of the array (as shown by measurement devices 28A to 28D. More generally, the charge measurement devices may be connected to selected elements in the array, preferably at peripheral edges of the array, and more preferably the corner elements of the array. A higher capacitance is preferred between neighbouring electrodes 25 around the perimeter of the array (typically 10-100 times the nearest neighbour capacitance) to produce a linear response. The decoding algorithm is:

$$x=(Q_A+Q_B)/(Q_A+Q_B+Q_C+Q_D)$$

$$y=(Q_A+Q_D)/(Q_A+Q_B+Q_C+Q_D)$$

where x and y are the charge centroid coordinates.

Figure 5:
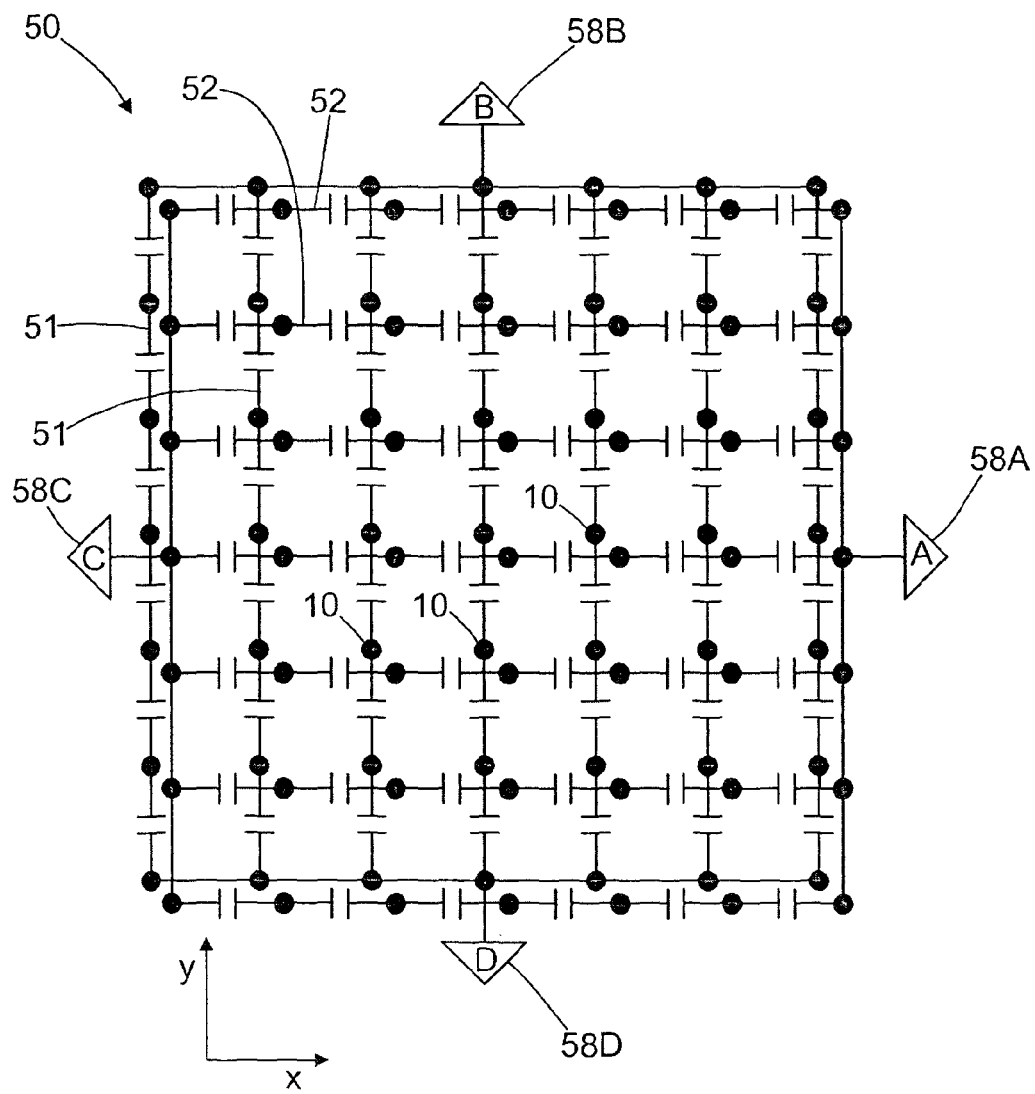
FIG. 5 is a schematic circuit diagram of an alternative capacitively coupled network of elements suitable for forming the charge read-out structure of a photon detector as in FIG. 1.

An alternative configuration for the array 9 of conductor elements 10 is shown in FIG. 5. The configuration of array 50 has a first sub-array comprising vertical chains 51 of conductor elements 10, the vertical chains 51 all connected at one end to charge measurement device 58B and all connected at the other end to charge measurement device 58D. The array 50 has a second sub-array comprising horizontal chains 52 of conductor elements 10, the horizontal chains 52 all connected at one end to charge measurement device 58A and all connected at the other end to charge measurement device 58C. The two sub-arrays preferably have no or minimal inter-capacitance. There is preferably no or minimal capacitance between elements 10 from adjacent chains within the same sub-array, as shown schematically. The capacitive division in this configuration of array is intrinsically linear and no additional, higher value capacitances are needed at the periphery of the array. However, division of the initial charge signal between the two sub-arrays may reduce the signal-to-noise ratio, and hence may degrade position resolution slightly.

Thus, in a general aspect, the charge can be divided into two separate sub-arrays of linear capacitance dividers. This configuration has an intrinsically linear response but somewhat lower spatial resolution, since only half of the signal is used to determine each position coordinate. The decoding algorithm for this array is:

$$x=(Q_A)/(Q_A+Q_C)$$

$$y=(Q_B)/(Q_B+Q_D)$$

Other designs of array can be considered which use more than four measurement nodes distributed in a two dimensional array within the active imaging area. A signal event charge can be collected on a subset of the measurement nodes, allowing the other temporally overlapping or simultaneous events to be detected on other node subsets.

The signal charge at each node is electronically measured, for example using a charge sensitive preamplifier, shaping amplifier and analogue to digital converter. Other techniques using fast timing preamplifiers, discriminators and the time-over-threshold techniques to measure pulse height (equivalent to charge) may be considered.

Using the intrinsic capacitance of the electrode array 9 of FIG. 3 (rather than discrete components added to the array except at the periphery thereof) can provide a major performance advantage since it reduces the capacitive load on the measurement devices (compared to the use of discrete components). This reduces the noise, and improves the spatial resolution by a large factor or, conversely, allows the detector to operate at lower gain which is a distinct advantage at high count rates. The combination of low noise capacitive division with the charge localisation provided by the resistive layer 7 reduces the noise further by eliminating partition noise. Partition noise is a noise contribution resulting from the statistics of the division of discrete charges (in this case, electrons) amongst a number of electrodes. Since we are not directly collecting, but capacitively coupling, the collected charge (which is temporarily localized on the resistive layer 7) to the electrodes 10, this noise component may reduce to zero. Partition noise, when present, dominates at low signal levels, owing to its proportionality to the reciprocal of the square root of collected charge, so the lack of this noise component also benefits performance at lower detector gain.

The device and method described here can be used in all fields where high resolution photon-counting, imaging is required in conjunction with precise photon arrival timing, of the order of picoseconds. Such fields include: (a) time resolved spectroscopy—FLIM, FRET, FCS, single molecule imaging; (b) 3D imaging, range finding, LIDAR, CRDS, CEAS; (c) quantum imaging, time correlated event imaging; (d) time of flight techniques—mass spectrometry, field ion microscopy, molecular dynamics; (e) neutral beam imaging—MBE diagnostics; (f) optical diffusion tomography; (g) luminescence/phosphorescence; (h) picosecond detectors with multi-pixel readout for particle physics, high energy physics, and astroparticle physics experiments e.g. for optical readout of fast scintillators in Cherenkov detectors.

Various changes to the illustrative embodiments are possible without departing from the scope of the invention. Although the resistive layer 7 and array 9 have been shown as having planar configuration, it will be understood that a non-planar geometry such as concave or other form of curve could be considered while still resolving charge events in two dimensions over the surface of the layer. It will also be understood that the principles can be used with a one dimensional array, i.e. resolving charge events in one dimension. It will also be understood that the principles can be used with a three dimensional array, with several stacked, insulated planes of electrodes using electrode overlap between the layers to produce inter-electrode capacitances of a suitable value. Such three dimensional arrays of electrodes could be realized using the planes of conductors within a multi-layer printed circuit board. In all of the examples discussed above, the arrays of electrodes need not be rectangular nor even strictly regular or periodic, provided that the location of charge events can still be determined by an appropriate algorithm that takes into account the array geometry.

Other embodiments are intentionally within the scope of the accompanying claims.

The invention claimed is:

1. A spatially-resolving charge detection device comprising:
   a continuous resistive layer configured to capture a charge incident thereon and being capacitively coupled to at least one two-dimensional planar array of discrete electrodes which are electrically insulated from one another and positioned behind the continuous resistive layer relative to the incident charge, each electrode in the array being capacitively coupled to an adjacent electrode in the array to form a capacitively coupled network of electrodes,
   selected ones of the electrodes in the array each being coupled to an array output for connection to a respective charge measurement device,
   the continuous resistive layer having a resistivity sufficient to temporarily localize the captured charge to an area corresponding to a subset of said electrodes in the array to form a capacitively induced charge thereon for a duration sufficient for signal measurement from the array of electrodes by the charge measurement devices,
   wherein the capacitive coupling of the electrodes in the array results in division of the capacitively induced charge among the electrodes such that a spatial position of the charge localized on the continuous resistive layer can be determined based on the relative outputs of the charge measurement devices.

2. The charge detection device of claim 1 further including a plurality of charge measurement devices coupled to the network, each charge measurement device being coupled to a different electrode in the array to sample a charge therefrom.

3. The charge detection device of claim 1 for use as a particle or photon detector, further comprising:
   a multiplication device for interacting with a particle or photon and generating a charge cloud therefrom; the multiplication device being positioned adjacent to the continuous resistive layer such that the continuous resistive layer interacts with the charge cloud to capture a charge thereon.

4. The charge detection device of claim 1 in which the array of electrically insulated electrodes comprises an array of electrically conductive elements,
   each element within the body of the array being capacitively coupled to the closest neighbour elements with a first capacitance value,
   each element at the periphery of the array being capacitively coupled to adjacent elements on the periphery of the array with a second capacitance value, the second capacitance value being greater than the first capacitance value.

5. The charge detection device of claim 4 in which each element in the body of the array is capacitively coupled to the next nearest elements in the array by a third capacitance value that is substantially lower than the first capacitance value.

6. The charge detection device of claim 4 in which the second capacitance value is between 10 and 100 times greater than the first capacitance value.

7. The charge detection device of claim 4 further comprising a plurality of charge measurement devices each connected to a selected element at the periphery of the array.

8. The charge detection device of claim 7 in which the selected elements are corner elements.

9. The charge detection device of claim 1 in which the array of electrically insulated electrodes comprises a first array of electrically conductive elements, each element within the body of the first array being capacitively coupled to first selected closest neighbour elements with a first capacitance value, and each element in the body of the first array having minimal or no capacitive coupling with second selected closest elements in the array, selected elements at the periphery of the first array being directly electrically connected to adjacent elements on the periphery of the first array.

10. The charge detection device of claim 9 further comprising a second array of conductive elements complementary to, and overlapping the first array, the first array being adapted for detecting the spatial position of charge on the continuous resistive layer in one dimension and the second array being adapted for detecting the spatial position of charge on the continuous resistive layer in a second dimension different from the first dimension.

11. The charge detection device of claim 9 further comprising a plurality of charge measurement devices each connected to a group of said selected elements at the periphery of the first or second arrays.

12. The charge detection device of claim 1 in which the array of electrodes is a substantially rectangular array.

13. The charge detection device of claim 3 in which the multiplication device comprises an electron multiplication device.

14. The charge detection device of claim 13 in which the multiplication device comprises a microchannel plate, a photomultiplier, or gas proportional counter.

15. The charge detection device of claim 3 in which the interacting particle is an ionizing particle or charged particle.

16. The charge detection device of claim 1 in which the continuous resistive layer has a surface resistivity adapted to enable charge localization over a period in the range 1 to 10000 ns.

17. The charge detection device of claim 2 further including a processing device coupled to each of the charge measurement devices to determine the spatial position of the localized charge.

18. A method of spatially-resolving the position of charge on a continuous resistive layer of a charge detection device comprising the steps of:

capturing an incident charge on the continuous resistive layer that is capacitively coupled to at least one two-dimensional planar array of discrete electrodes which are electrically insulated from one another and positioned behind the continuous resistive layer relative to the incident charge, each electrode in the array being capacitively coupled to an adjacent electrode in the array to form a capacitively coupled network of electrodes;

temporary localizing the charge on the continuous resistive layer of an area corresponding to a subset of the electrodes in the array using the resistivity of the continuous resistive layer to form a capacitively induced charge on the subset of electrodes;

dividing the capacitively induced charge among the electrodes of the array using the capacitive coupling of the electrodes;

measuring the capacitively induced charge by sampling the array using respective charge measurement devices coupled to selected ones of the electrodes in the array; and determining a spatial position of the charge localized on the continuous resistive layer based on the relative outputs of said charge measurement devices.

19. The charge detection device of claim 1 comprising a plurality of two-dimensional planar arrays of discrete electrodes stacked on top of one another to form a three-dimensional array of discrete electrodes.

\* \* \* \* \*